United States Patent

[11] 3,582,716

[72] Inventor Richard O. Traina
Randolph Township, N.J.
[21] Appl. No. 751,316
[22] Filed Aug. 8, 1968
[45] Patented June 1, 1971
[73] Assignee Plessey Airborne Corporation
Hillside, N.J.

[54] APPARATUS FOR PROVIDING TIME DELAY UPON TOTAL DEENERGIZATION
14 Claims, 2 Drawing Figs.

[52] U.S. Cl. .......... 317/142, 317/148.5, 317/155.5
[51] Int. Cl. .......... H01h 47/18
[50] Field of Search .......... 317/142, 148.5, 151, 155.5

[56] References Cited
UNITED STATES PATENTS

| | | | |
|---|---|---|---|
| 3,441,810 | 4/1969 | Traina | 317/142 |
| 3,267,337 | 8/1966 | Doyle et al. | 317/148.5 |
| 3,434,026 | 3/1969 | Doyle | 318/125 |
| 3,12/,542 | 3/1964 | Riebs | 317/151X |

*Primary Examiner*—J. D. Miller
*Assistant Examiner*—Harry E. Moose, Jr.
*Attorney*—Harry G. Shapiro

ABSTRACT: Solid-state apparatus for providing an output at the end of a predetermined delay interval commencing with total deenergization of the apparatus. A main capacitor is charged from the power supply during energization of the apparatus, and a timing capacitor, which is prevented from charging during energization of the apparatus, is charged from the main capacitor upon total deenergization. A silicon-controlled switch senses the charge buildup upon the timing capacitor and becomes conductive when the charge reaches a predetermined level, thereby discharging the main capacitor through an SCR and producing an output from a latching relay, which may be a two-coil mechanically latching type or a single-coil magnetically latching type.

INVENTOR
RICHARD O. TRAINA

BY Harry G. Shapiro
ATTORNEY

APPARATUS FOR PROVIDING TIME DELAY UPON TOTAL DEENERGIZATION

BACKGROUND OF THE INVENTION

This invention relates to apparatus for providing a delay upon total deenergization or to so-called delay on dropout circuits.

Delay on dropout (DODO) circuits described in the prior art have utilized capacitors which are charged while the circuit is energized and which commence to discharge when the circuit is deenergized. When the charge on the capacitor decreases to a predetermined level, some form of switching or triggering device becomes effective to operate a relay, the time from deenergization of the circuit until the predetermined discharge level is reached constituting a delay interval. In practice such systems have suffered from certain deficiencies, among which are inability to produce long delay intervals (because of large current drain upon the storage capacitor), and inability to produce reliable, repeatable results (because of wide variation in component tolerances). In the applicant's copending application, Ser. No. 607,354, filed Dec. 21, 1966 for "Solid-State Time Delay Apparatus", now U.S. Pat. No. 3,441,810 DODO circuits are disclosed which overcome the deficiencies of the prior-art circuits. The circuits herein disclosed are improvements upon the applicant's prior circuits.

BRIEF DESCRIPTION OF THE INVENTION

It is accordingly a principal object of the present invention to provide improved circuits for producing a time delay upon total deenergization of the circuits.

Another object of the invention is to provide DODO circuits which are capable of providing a wide range of time delays, from very short to very long, and which are nevertheless simple in construction.

A further object of the invention is to provide DODO circuits in which the main capacitor is charged very rapidly when the circuit is energized.

Still another object of the invention is to provide circuits of the foregoing type employing a very high impedance device for sensing the charge buildup upon a timing capacitor.

Yet another object of the invention is to provide circuits of the foregoing type in which latching relays are employed in a unique manner.

BRIEF DESCRIPTION OF THE DRAWINGS

The foregoing and other objects, advantages, and features of the invention, and the manner in which the same are accomplished will become more readily apparent upon consideration of the following detailed description of the invention taken in conjunction with the accompanying drawings, which illustrate preferred and exemplary embodiments, and wherein.

DETAILED DESCRIPTION OF THE INVENTION

Figure 1:
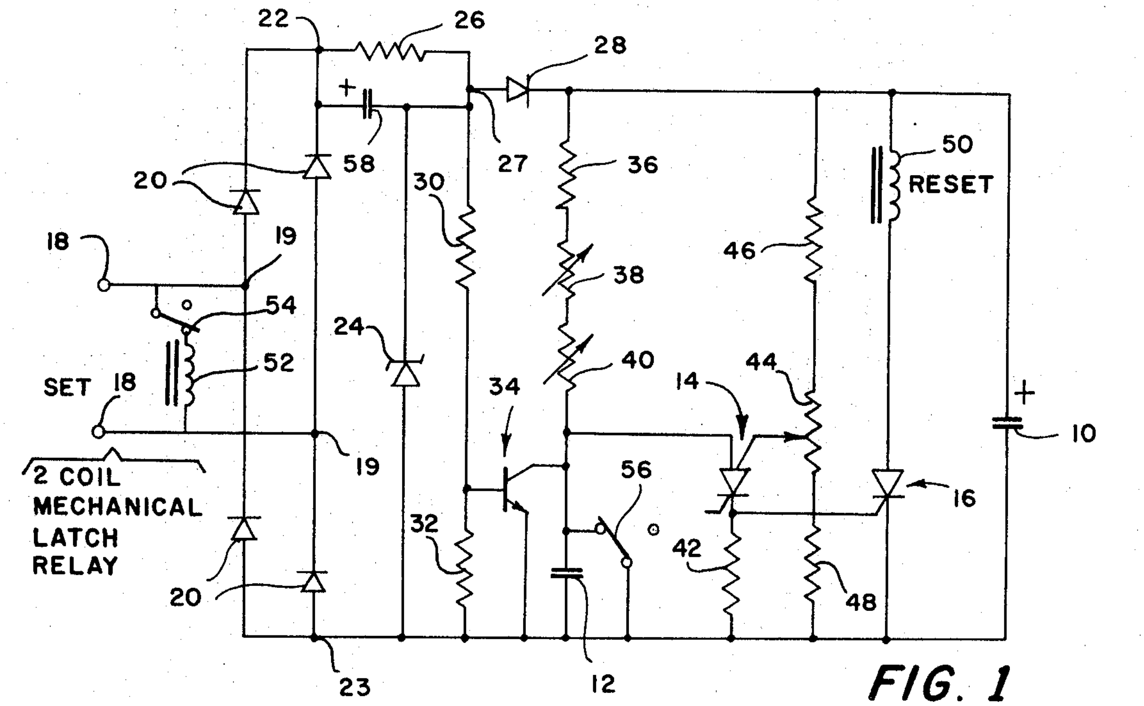
FIG. 1 is a circuit diagram of a first form of DODO circuit in accordance with the invention.
Figure 2:
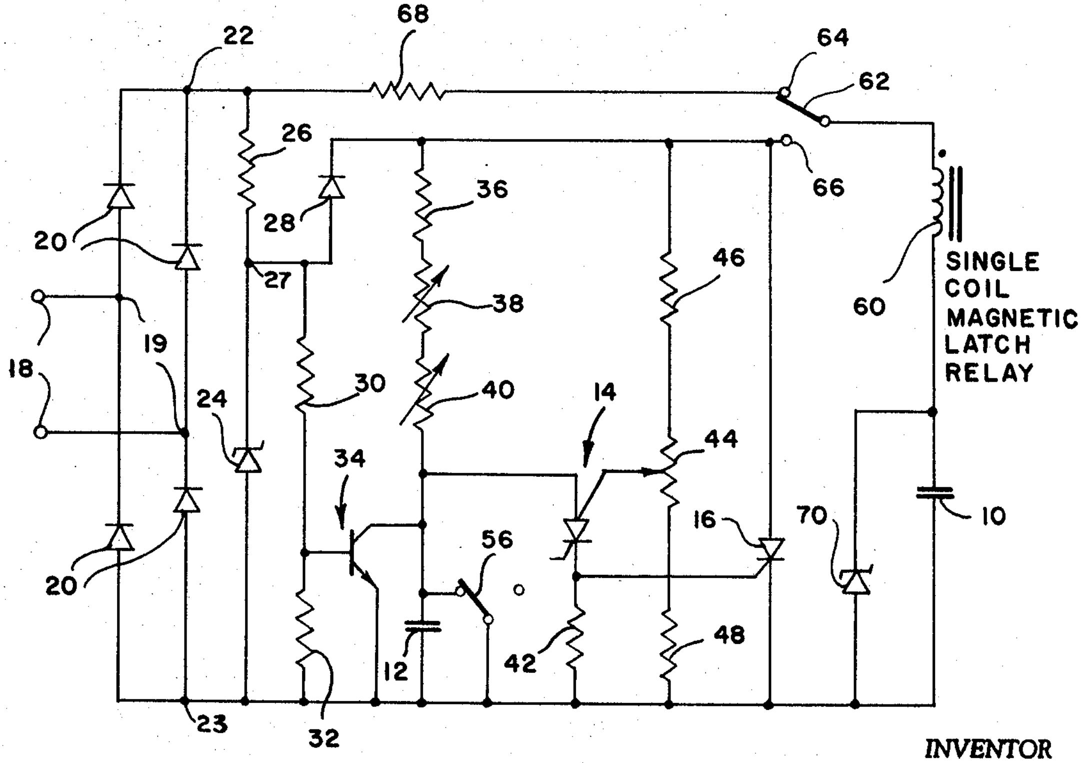
FIG. 2 is a circuit diagram of a second form of DODO circuit in accordance with the invention.

Referring to the drawings, both the embodiments of FIG. 1 and FIG. 2 utilize a main storage capacitor 10, a timing capacitor 12 and a four-layer silicon-controlled switch (SCS) 14 which triggers a silicon-controlled rectifier (SCR) 16. Both embodiments have power input terminals 18 to which alternating current, for example, may be supplied, the power supply terminals being connected to input terminals 19 of a bridge rectifier comprising diodes 20, the conjugate or output terminals 22 and 23 of the bridge rectifier providing DC operating potentials. The DC output of the bridge rectifier is regulated by a Zener diode 24 connected in series with a resistor 26 across terminals 22 and 23, the junction 27 of resistor 26 and Zener diode 24 being connected to the anode of a charging rectifier 28. A voltage divider comprising resistors 30 and 32 in series is connected between junction 27 and terminal 23, the junction between resistors 30 and 32 being connected to the base of bipolar transistor 34, which has its emitter-collector path shunted across timing capacitor 12 and constitutes a discharge switch. Resistors 36, 38, and 40 connected in series with the timing capacitor 12 constitute the timing resistance, resistor 40 being variable by the user to select the desired time delay, and resistor 38 being variable to trim differences in resistor 40. The SCS 14 has its anode connected to the junction of resistor 40 and one side of the capacitor 12 and has its cathode connected through a resistor 42 to terminal 23 of the power supply. The anode gate is used for biasing and is connected to the tap of a potentiometer 44, which is in series with resistors 46 and 48 from the cathode of charging rectifier 28 to terminal 23. The cathode gate of the SCS is not utilized. The cathode of the SCS is connected to the gate of SCR 16, the cathode of which is connected to terminal 23.

In the embodiment of FIG. 1 the anode of SCR 16 is connected to one side of the reset coil 50 of a mechanically latching relay, the other side of the reset coil being connected to one side of capacitor 10 and the other side of capacitor 10 being connected to the cathode of SCR 16. The mechanically latching relay, which has two stable states, constitutes the output device of the circuit and has conventional output-switching terminals (not shown) for performing any desired switching function. The relay has a set coil 52 connected in series with switch 54, which is operated by coils 50 and 52 and which closes when reset coil 50 is momentarily energized. The relay also has another switch, 56, connected across timing capacitor 12 and closed concurrently with switch 54. The embodiment of FIG. 1 includes a third capacitor, 58, connected across resistor 26 and the function of which will be apparent hereinafter.

The embodiment of FIG. 2 employs a single-coil magnetically latching relay (such as that described in U.S. Pat. No. 3,239,722 or the type manufactured by Potter and Brumfield), the coil 60 being connected in series with main capacitor 10. The relay includes switch 56 described with respect to FIG. 1 and also includes a double-throw switch 62, the blade of which engages contact 64 after energization of coil 60 with one polarity and engages contact 66 after energization of coil 60 with the reverse polarity. Contact 64 is connected to power supply terminal 22 by a resistor 68, while contact 66 is connected to the anode of SCR 16, to one side of resistors 36 and 46, and to the cathode of charging rectifier 28.

The operation of the embodiment of FIG. 1 will be described first. Upon the application of power to power input terminals 18, the set coil 52 is energized to transfer the relay contacts to their alternate positions, that is, to open switch 54, thereby interrupting the energization of coil 52, and to open switch 56, thereby removing the discharge path across timing capacitor 12 constituted by the switch. Main capacitor 10 charges very rapidly by virtue of its series connection with capacitor 58. The charging of capacitor 10 is thus independent of the resistance of resistor 26. The capacitor divider including capacitors 10 and 58 allows almost instantaneous transfer of sufficient charge to charge capacitor 10 to the desired level, the rectified DC voltage from the bridge rectifier dividing across capacitors 10 and 58 inversely with respect to their capacitances. For example, the capacitances may be chosen to give a nominal 11 volts across capacitor 10 in 10 milliseconds. Thus, even though the power is applied almost instantaneously, capacitor 10 will charge to the desired level.

As long as the operating voltage is applied to terminals 18, diode 28 will be forward biased. Resistors 30 and 32 are chosen to ensure saturation of transistor 34 when power is applied. The transistor is thus rendered highly conductive and prevents timing capacitor 12 from charging as long as the input power is applied. When the power is removed, rectifier 28 is reverse biased by capacitor 10, which attempts to supply current to the rectifier in the reverse direction. Transistor 34 cuts off and allows capacitor 12 to charge from capacitor 10 through the series resistance formed by resistors 36, 38, and 40.

The voltage across timing capacitor 12 is monitored by the high anode-to-cathode impedance of SCS 14, the trip point at which the SCS turns on being determined by the voltage divider formed by resistors 46, 44, and 48. The anode gate of the SCS, while presenting a very high impedance, so as to minimize drain of the charge upon capacitor 10, is able to control the point at which the SCS turns on. The current through the voltage divider 46, 44, 48 is held to 1 microampere DC, for example, and along with the small charging current which flows into the timing capacitor 12 forms the only drain on the reserve charge in capacitor 10. Nominally, after 400 seconds the voltage across capacitor 10 which started, for example, at 12 volts is down to 10.5 volts.

When capacitor 12 has charged to the voltage at the anode gate of the SCS, the SCS turns on and a voltage pulse is delivered across resistor 42. This is coupled to the gate of SCR 16, which turns on. The remaining charge upon capacitor 10 is discharged through the SCR and reset coil 50, which returns the relay to its other stable state. The reclosing of switch 56 completely discharges the timing capacitor 12 and turns off the SCS 14. This completes the cycle of operation.

It now remains to describe the operation of the embodiment of FIG. 2. Upon the application of power, capacitor 10 is charged through resistor 68 and the coil 60 of the relay. The inrush of charging current transfers the relay to its other stable state, the relay being held in that state by its magnetic latch. Switch 56 opens and switch 62 transfers to close upon contact 66. The voltage across capacitor 10 is clamped by Zener diode 70 to a nominal 12 volts, for example, Zener diode 24 also serving to clamp the voltage across capacitor 10 after transfer of switch 62 and to provide line voltage compensation.

As long as operate voltage is applied, diode 28 is forward biased, and transistor 34 remains saturated, thereby preventing the timing capacitor 12 from charging. When the power is removed, diode 28 is reverse biased by the voltage stored upon capacitor 10. Transistor 34 is cut off, allowing capacitor 12 to charge through resistors 36, 38, and 40. The timing circuit operates as described in connection with the embodiment of FIG. 1, and when capacitor 12 is charged to a predetermined level, the SCS turns on, turning on SCR 16. The charge remaining in capacitor 10 is then discharged through the relay coil 60 in the reverse direction, that is, opposite to the direction of charging current. The magnetic flux generated by this current subtracts from the permanent magnet flux of the magnetic latch, and the relay returns to its other stable state, closing switch 56, so as to discharge timing capacitor 12, and returning switch 62 to the position illustrated. This completes the cycle of operation.

By virtue of the high-impedance characteristics of the SCS 14 very long delay periods are possible in addition to the short delay periods of which prior circuits are capable. The high (almost infinite) impedance anode circuit of the SCS prevents interference with the timing network, while the high-impedance anode gate circuit of the SCS permits extremely low bias currents and avoids draining of the charge upon the main capacitor 10. An equivalent high-impedance charge-sensing device, such as a programable unijunction transistor (PUT) may be employed instead of the SCS, the anode and cathode of the PUT being connected in the same manner as the SCS and the gate of the PUT being connected in the same manner as the anode gate of the SCS.

While preferred embodiments of the invention have been shown and described, it will be apparent to those skilled in the art that changes can be made in these embodiments without departing from the principles and spirit of the invention, the scope of which is defined in the appended claims.

The invention I claim is:

1. A delay on drop out circuit comprising power supply means, a first charge storage device, a second charge storage device, means for charging said first charge storage device, means for connecting said first charge storage device to said second charge storage device, means for preventing the charging of said second charge storage device while said power supply means is energized and responsive to deenergization of said power supply means for permitting said second charge storage device to charge from said first charge storage device, and means responsive to the charging of said second charge storage device to a predetermined level for producing an output, the last-mentioned means comprising a semiconductor switch including an anode, a cathode, and a gate, means connecting said anode to said second charge storage device and for varying the anode potential relative to the gate potential in accordance with the charge stored in said second charge storage device and means for applying a bias to said gate.

2. The circuit of claim 1, wherein said switch is a silicon-controlled switch having its anode gate connected to said bias applying means.

3. A delay on drop out circuit comprising power supply means, a first charge storage device, a second charge storage device, means for charging said first charge storage device, means for connecting said first charge storage device to said second charge storage device, means for preventing the charging of said second charge storage device while said power supply means is energized and responsive to deenergization of said power supply means for permitting said second charge storage device to charge from said first charge storage device, and means responsive to the charging of said second charge storage device to a predetermined level for producing an output, said means for preventing the charging of said second charge storage device comprising an electric switch connected across said second charge storage device and having a control electrode connected to means including a voltage divider connected to said power supply means for rendering said switch conductive continuously when said power supply means is energized.

4. The circuit of claim 3, wherein said switch is a bipolar transistor, and said control electrode is the base of the transistor.

5. The circuit of claim 4, wherein said means for charging said first charge storage device comprises a charging rectifier having means for connecting it in series with said first charge storage device across said voltage divider, said second charge storage device also being connected in series with said charging rectifier across said voltage divider.

6. A delay on drop out circuit comprising power supply means, a first charge storage device, a second charge storage device, means for charging said first charge storage device, means for connecting said first charge storage device to said second charge storage device, means for preventing the charging of said second charge storage device while said power supply means is energized and responsive to deenergization of said power supply means for permitting said second charge storage device to charge from said first charge storage device, and means responsive to the charging of said second charge storage device to a predetermined level for producing an output, said means for charging said first charge storage device comprising a third charge storage device connected in series with said first charge storage device and said power supply means.

7. The circuit of claim 6, further comprising means for clamping the voltage across said first charge storage device while said power supply means is energized, said clamping means comprising a resistor and a voltage-regulating device connected across said power supply means, the junction of said resistor and said regulating device being connected to said first charge storage device, said third charge storage device being connected across said resistor.

8. The circuit of claim 7, wherein said junction is connected to said first charge storage device by a charging rectifier.

9. A delay on dropout circuit comprising power supply means including a regulated DC supply having a pair of output terminals, a first charge storage device having means including a charging rectifier for connecting said device between said terminals, a second charge storage device having impedance means connecting said second charge storage device in series with said charging rectifier between said terminals, electric switch means connected across said second charge storage device and having a control electrode connected to a voltage divider connected between said terminals, a semiconductor-controlled switch having a high-impedance charge-sensing circuit including a pair of electrodes of the switch connected across said second charge storage device and having a high-impedance bias circuit including a voltage divider connected in series with said charging rectifier between said terminals and connected to a further electrode of said switch, a semiconductor-controlled rectifier having its principal electrode path connected in series with said charging rectifier between said terminals and having its gate electrode connected to an output electrode of said semiconductor-controlled switch, and means including a relay for connecting said principal electrode path across said first charge storage device, said relay having a switch for discharging said second charge storage device.

10. A delay on dropout circuit comprising power supply means, a first charge storage device, a second charge storage device, means for charging said first charge storage device from said power supply means, means for connecting said first charge storage device to said second charge storage device, means connected to said power supply means for preventing the charging of said second charge storage device while said power supply means is energized and responsive to deenergization of said power supply means for permitting said second charge storage device to charge from said first charge storage device, and means responsive to the charging of said second charge storage device to a predetermined level for producing an output, the last-mentioned means comprising a semiconductor switch including an anode, a cathode, and a gate, means connecting said anode and said cathode to opposite sides, respectively, of said second charge storage device, and means for applying a bias to said gate, said means for producing an output further comprising a latching relay having a set coil, a reset coil, and a pair of switches controlled by the coils, means including one of the switches of said pair for energizing said set coil from said power supply means, and means responsive to said semiconductor switch for discharging said first charge storage device through said reset coil when said second charge storage device is charged to said predetermined level, the other switch of said pair being connected across said second charge storage device and being adapted to close when said first charge storage device is discharged through said reset coil.

11. The circuit of claim 10, wherein said power supply means comprises a pair of AC input terminals connected to rectifier means for supplying DC to said first charge storage device and wherein said set coil and said one switch are connected in series between said AC input terminals.

12. A delay on dropout circuit comprising power supply means, a first charge storage device, a second charge storage device, means for connecting said first charge storage device to said second charge storage device, means connected to said power supply means for preventing the charging of said second charge storage device while said power supply means is energized and responsive to deenergization of said power supply means for permitting said second charge storage device to charge from said first charge storage device, and means responsive to the charging of said second charge storage device to a predetermined level for producing an output, the last-mentioned means comprising a semiconductor switch including an anode, a cathode, and a gate, means connecting said anode and said cathode to opposite sides, respectively, of said second charge storage device, and means for applying a bias to said gate, said means for charging said first charge storage device to said second charge storage device comprising a single coil-latching relay having a double-throw switch operated by the coil of said relay, said double-throw switch having one position connecting one side of said coil to said power supply means and having another position connecting said side of said coil to said second charge storage device, the other side of said coil being connected to said first charge storage device, said output-producing means further comprising means responsive to said semiconductor switch for energizing said coil when said double-throw switch is in said other position.

13. The circuit of claim 12, said relay having another switch for discharging said second charge storage device when said double-throw switch is in its said one position.

14. The circuit of claim 12, further comprising voltage regulator means and means for connecting said voltage regulator means across said first charge storage device.